US011120698B2

(12) United States Patent
Scarlatti et al.

(10) Patent No.: US 11,120,698 B2
(45) Date of Patent: Sep. 14, 2021

(54) SYSTEM AND METHOD FOR DETERMINING THE RUNWAY CONFIGURATION OF AN AIRPORT

(71) Applicant: The Boeing Company, Chicago, IL (US)

(72) Inventors: David Scarlatti, Madrid (ES); David Esteban Campillo, Madrid (ES); Enrique Casado, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 163 days.

(21) Appl. No.: 16/148,573

(22) Filed: Oct. 1, 2018

(65) Prior Publication Data
US 2019/0147752 A1    May 16, 2019

(30) Foreign Application Priority Data
Nov. 13, 2017    (EP) .................................... 17382762

(51) Int. Cl.
  *G06N 3/08*    (2006.01)
  *G08G 5/00*    (2006.01)
  *G06Q 10/04*    (2012.01)
(52) U.S. Cl.
  CPC ............. *G08G 5/0082* (2013.01); *G06N 3/08* (2013.01); *G06Q 10/047* (2013.01); *G08G 5/0026* (2013.01); *G08G 5/0039* (2013.01)
(58) Field of Classification Search
  CPC ...... G06N 3/08; G06Q 10/047; G08G 5/0026; G08G 5/0039; G08G 5/0082
  See application file for complete search history.

(56) References Cited

U.S. PATENT DOCUMENTS

| 5,712,785 A | * | 1/1998 | Mok | ..................... G01S 13/913 244/183 |
| 9,245,170 B1 | * | 1/2016 | Nikic | .................. G06K 9/00201 |
| 2002/0093433 A1 | * | 7/2002 | Kapadia | .................. B64F 1/002 340/945 |

(Continued)

FOREIGN PATENT DOCUMENTS

EP    3166055 A1    5/2017

OTHER PUBLICATIONS

Khadilikar, Estimation of aircraft Taxi-out Fuel Burn using Flight Data Recorder Archives (2011), MIT (Year: 2011).*

(Continued)

*Primary Examiner* — Mahmoud S Ismail
*Assistant Examiner* — Gabriel Anfinrud
(74) *Attorney, Agent, or Firm* — Parsons Behle & Latimer

(57) ABSTRACT

Disclosed is a system and method for determining the runway configuration of an airport. The method may include retrieving recorded surveillance data including instances of aircraft positions at an airport; determining a plurality of three-dimensional surveillance cells at each end of one or more runways of the airport; computing a count of the number of aircraft positions within each surveillance cell; and determining a current configuration for each runway based on the count computed for the surveillance cells of the runway. The predicted runway configuration of the airport can be used for updating the flight plan of an aircraft to reduce the total flight duration and minimize fuel consumption.

20 Claims, 13 Drawing Sheets

(56) References Cited

U.S. PATENT DOCUMENTS

| | | | |
|---|---|---|---|
| 2011/0264313 A1 | 10/2011 | Sampath | |
| 2013/0329052 A1* | 12/2013 | Chew | H04N 7/181 |
| | | | 348/159 |
| 2017/0132940 A1* | 5/2017 | Lopez Leones | G06F 30/20 |
| 2017/0140656 A1* | 5/2017 | Mott | G08G 5/0082 |

OTHER PUBLICATIONS

FAA Airplane Flying Handbook, chapter 2, Jun. 29, 2017 from Wayback Machine (Year: 2017).*

Anonymous: "Machine learning—Wikipedia, the free encyclopedia", XP055255609, Retrieved from the Internet:URL: https://en.wikipedia.org/w/index.php?title=Machine_learning&oldid= 641213101 [retrieved on Mar. 7, 2016] Jan. 6, 2015.

European Patent Office; Summons to attend oral proceedings pursuant to Rule 115(1) EPC; EP Application No. 17382762.7 dated Apr. 8, 2019.

European Patent Office; Office Action issued in European Patent Application No. EP19382762.7 dated Nov. 13, 2019.

* cited by examiner

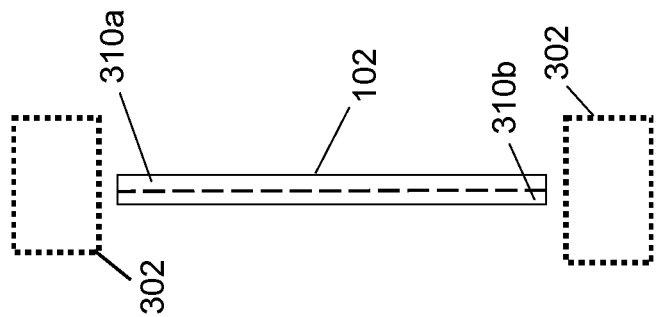
FIG. 4D
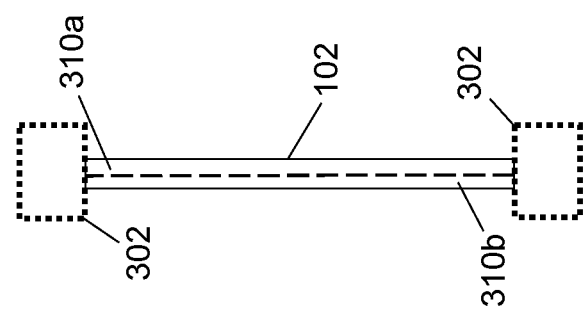
FIG. 4C
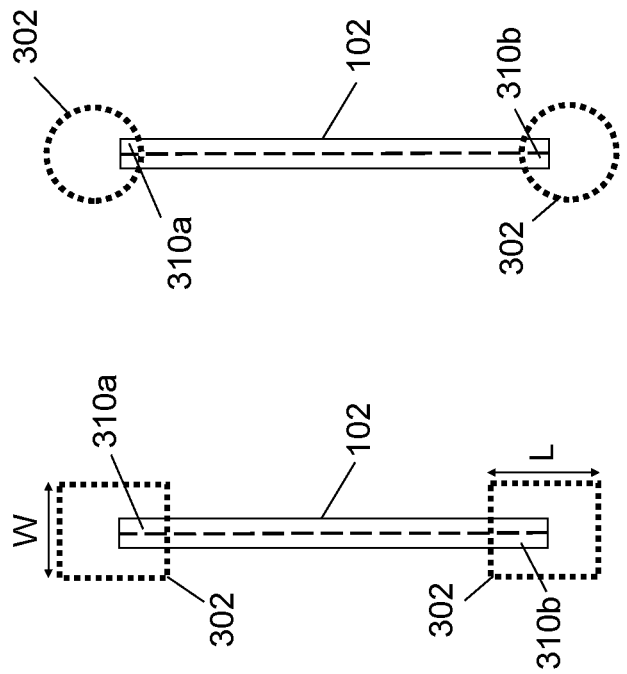
FIG. 4B
FIG. 4A

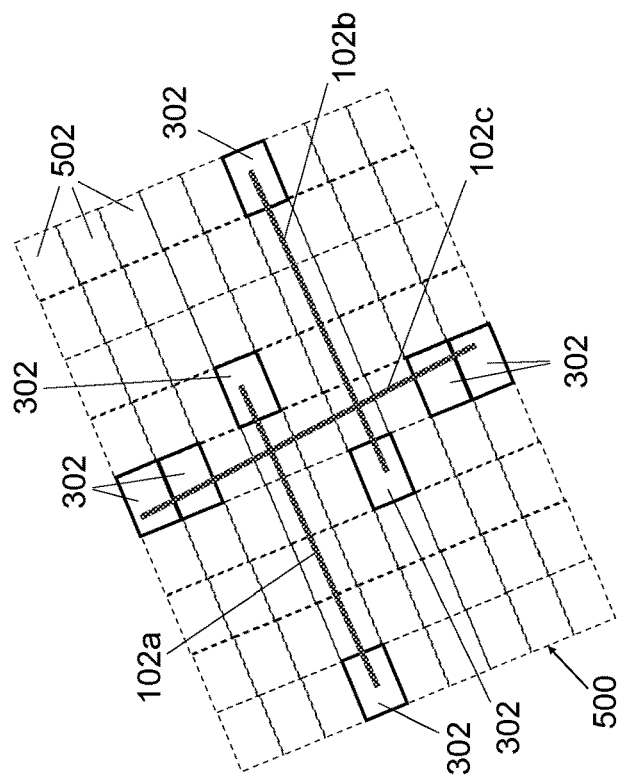
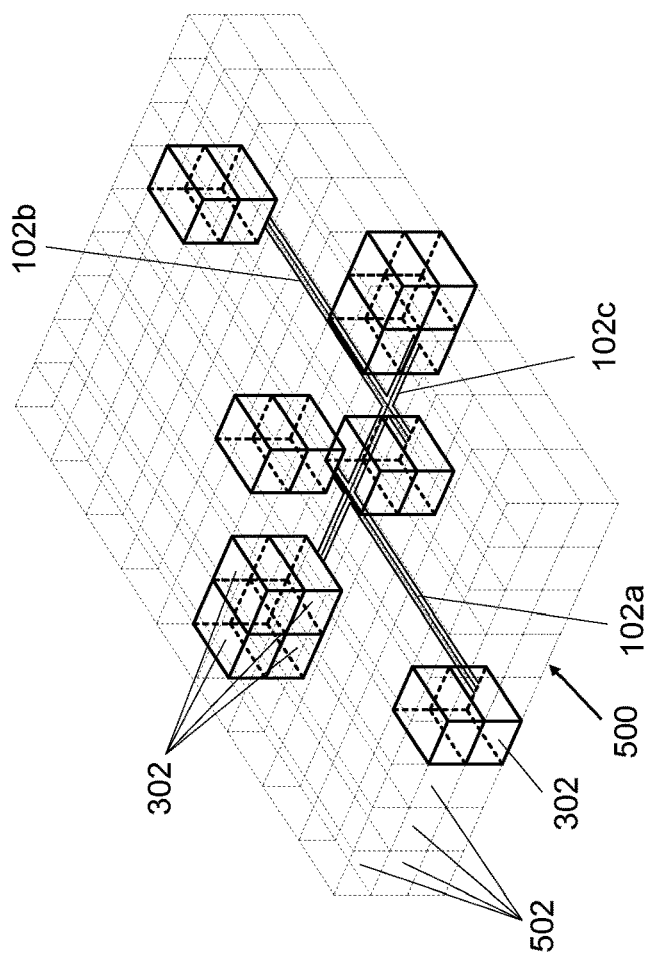
FIG. 5B
FIG. 5A

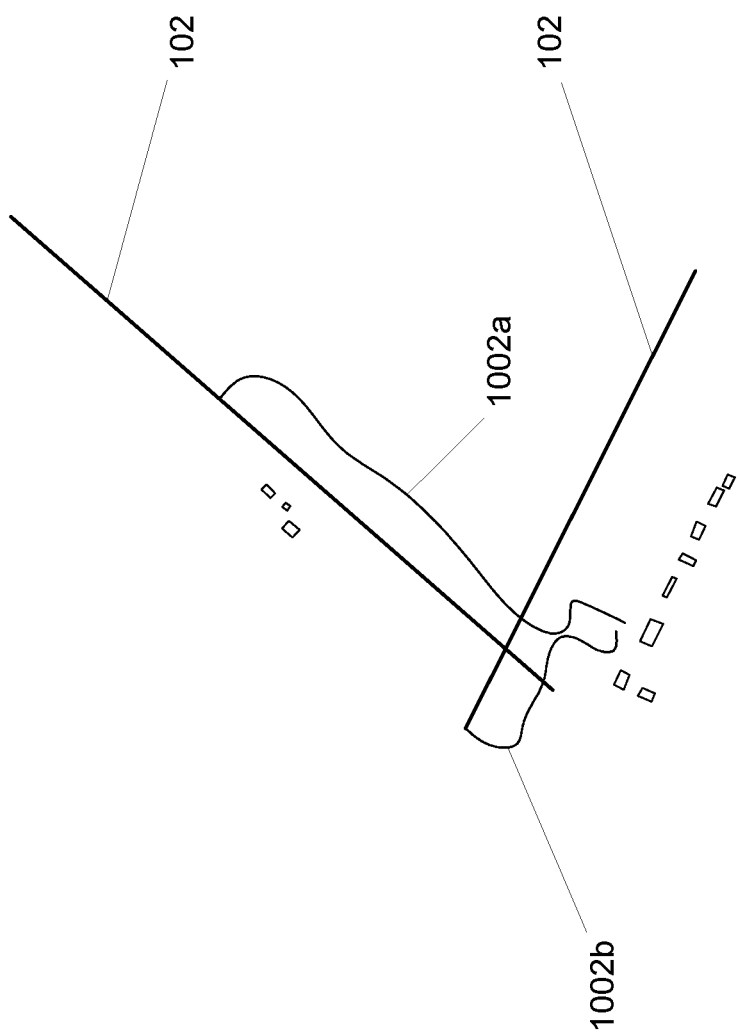

SYSTEM AND METHOD FOR DETERMINING THE RUNWAY CONFIGURATION OF AN AIRPORT

CROSS-REFERENCE TO RELATED APPLICATIONS

This application claims the benefit of, and priority to, European Patent Application No. 17382762.7, filed on Nov. 13, 2017 and entitled "A System and Method for Determining the Runway Configuration of an Airport," the contents of which are herein incorporated by reference in their entirety.

FIELD

The present disclosure is comprised in the field of avionics and relates to methods for determining the configuration of airport runways and methods for updating and improving aircraft flight plans.

BACKGROUND

Knowing the runway configuration of an airport is beneficial in providing accurate services and predictions for airlines to operate efficiently. Predicting the runway configuration of departure and destination airports has a direct impact in the flight performance of an aircraft, allowing the right planning of total flight duration and the fuel needed to execute the flight.

Although some airports update and publish runway configuration information to airlines, this is not the case for many other airports. Existing solutions for airports not reporting this information may include geometric modeling of the tracks of arrival and departure flights to find possible configurations for each runway. This approach has high computational cost and cannot be applied for real-time detection during flight, for instance.

Therefore, there is a need to provide a computationally-efficient method for determining the current runway configuration that overcomes the existing drawbacks.

SUMMARY

The present disclosure refers to a system, a computer-implemented method and a computer program product for determining the runway configuration of an airport and for updating an aircraft flight plan based on the determined runway configuration.

In an embodiment, the method for determining the runway configuration employs a data-driven based prediction algorithm that identifies an airport runway configuration based on automated aircraft surveillance reports and a known airport layout. The method may not rely on geometric calculations of the aircraft trajectories to infer the runway configuration of an airport. Instead, the method uses surveillance data of the terminal area.

In some embodiments, the method includes data collection in which aircraft positions are obtained (e.g. reported by ADS-B (Automatic Dependent Surveillance-Broadcast), secondary radar or any other data source available at the airport). The method may also include defining a 3D mesh centered on the airport and counting the number of position reports of an aircraft in each of the surveillance cells of the mesh for a period of time. The selection of the 3D mesh and the size and number of the surveillance cells for the data-driven process may be improved in an iteration process.

The method of the present disclosure enables improving flight planning by predicting the airport runway configuration, offering better estimations of real flight time and fuel needed. In some embodiments, a machine learning method is applied to determine the runway configuration for both the departure and destination airport. The goal is to reduce fuel consumption on approach and takeoff from the airport as well as taxi to/from gate once the configuration at the airports is known. With the runway configurations known, an accurate estimate of fuel usage can be made. The method uses a model in which actual taxi distances can also be optimized in an iterative process with controlled training datasets.

A first aspect of the present disclosure refers to a method for determining the runway configuration of an airport. In an embodiment, the method includes retrieving recorded surveillance data including instances of aircraft positions at an airport; determining a plurality of three-dimensional surveillance cells at each end of at least one runway of the airport; computing a count of the number of aircraft positions within each surveillance cell; and determining a current configuration for each runway based on the count computed for the surveillance cells of the runway.

Determining surveillance cells may comprise the following steps: retrieving information on the spatial arrangement of the airport runways; defining a three-dimensional mesh on the airport, the mesh being formed by a set of mesh cells; and selecting the surveillance cells from among the mesh cells.

Determining the current runway configuration for each runway may comprise a previous training based on a plurality of training surveillance data sets including instances for the plurality of all available configurations for the corresponding runway, where each surveillance data set may correspond to a different period of time.

In an embodiment corresponding to a supervised learning approach, the training is performed using a machine learning algorithm fed with known runway configurations added to the training surveillance data sets.

In another embodiment, corresponding to an unsupervised learning approach, the training is performed by computing, for each surveillance data set, a count of the number of aircraft positions within each surveillance cell; indicating the number of available configurations for each runway; and, for each runway, clustering the counts for the surveillance cells associated to the runaway to obtain clusters corresponding to each available configuration.

According to an embodiment, the surveillance cells are parallelepipeds. The surveillance cells may have a symmetry axis which runs parallel to the associated runway. The dimensions of the surveillance cells associated to a runway may be proportional to the length of the runway.

The present disclosure also refers to a method for updating an aircraft flight plan, including the previously discussed method for determining the current runway configuration of an airport and an updating of the flight plan of an aircraft based on the predicted airport runway configuration. The airport may be an arrival airport or a departure airport for the aircraft. In an embodiment, the updating of the flight plan is performed prior to the departure of the aircraft, and the method includes updating the quantity of fuel to be loaded onto the aircraft based on the current runway configuration of the airport. In another embodiment, the updating of the flight plan includes updating the taxiing plan of the aircraft on the airport. In yet another embodiment, the airport is an arrival airport of the aircraft, the updating of the flight plan is performed during the flight of the aircraft; and the updating of the flight plan includes determining a flight path for approaching the airport considering the current runway configuration of the airport.

Another aspect of the present disclosure refers to a system for determining the runway configuration of an airport. In an embodiment, the system includes a processing unit configured to execute the steps of the method as previously described. The disclosure also refers to a system for updating an aircraft flight plan, including the system for determining the runway configuration of an airport and a flight plan update module configured to receive a flight plan of an aircraft and compute an updated flight plan for the aircraft based on the current runway configuration of the airport.

In accordance with a further aspect of the present disclosure there is provided a computer program product for determining the runway configuration of an airport. In an embodiment, the computer program product includes at least one non-transitory computer-readable storage medium including a set of instructions stored therein which, when executed by a processor, causes the processor to perform the method for determining the airport runway configuration. Another aspect of the present disclosure refers to a computer program product for updating an aircraft flight plan, including at least one computer-readable storage medium provided with a set of instructions stored therein which, when executed by a processor, causes the processor to perform the method for updating an aircraft flight plan as discussed before.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

A series of drawings which aid in better understanding the invention and which are expressly related with an embodiment of said invention, presented as a non-limiting example thereof, are very briefly described below.

FIGS. 4A to 4D represents several examples for different shapes, sizes and locations of surveillance cells at each end of a runway.

FIGS. 5A and 5B depict respectively in a perspective view and a plan view, the surveillance cells selected for a three-runway airport.

FIGS. 9A, 9B, 10 and 11 represent different scenarios in which an aircraft flight plan is updated using the predicted runway configuration.

DETAILED DESCRIPTION

The present disclosure refers to a computer-implemented method for predicting the runway configuration of departure and/or destination airports, and for updating an aircraft flight plan based on said prediction.

Figure 1:
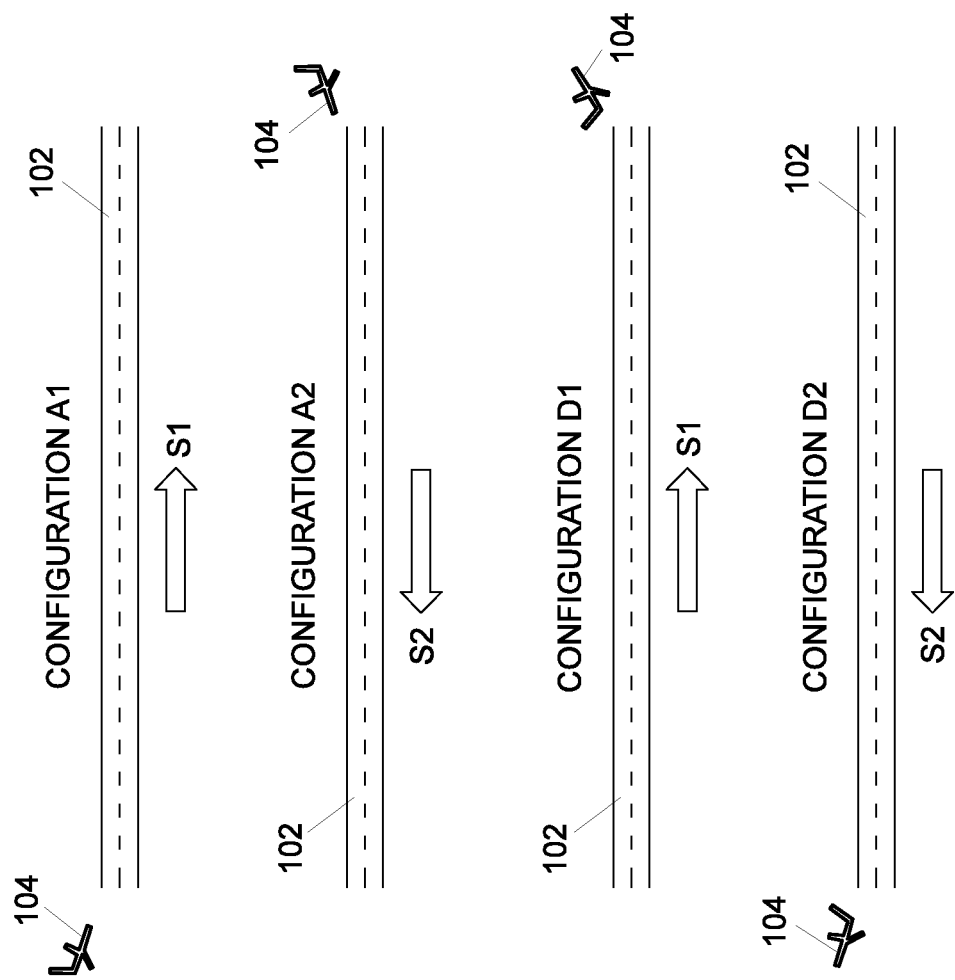
FIG. 1 represents four different configurations for an active runway.

An active runway 102 of an airport can be operated in several configurations. Firstly, a runway 102 may be configured either as an arrival (A) or as a departure (D) runway. Besides, for each runway the direction of departure or arrival of aircraft 104 may also change with time, leaving four available configurations, as depicted in FIG. 1. Runway configurations are typically designated in the form {A1, A2, D1, D2} where A1 and A2 are the arrival runways and D1 and D2 are the departure runways in the two available directions (s1, s2).

An active runway 102 can therefore operate in four available configurations (A1, A2, D1, D2). Using automated aircraft surveillance reports and the known airport geometry, the method of the present disclosure may predict the current configuration of one or more runways of an airport.

Figure 2:
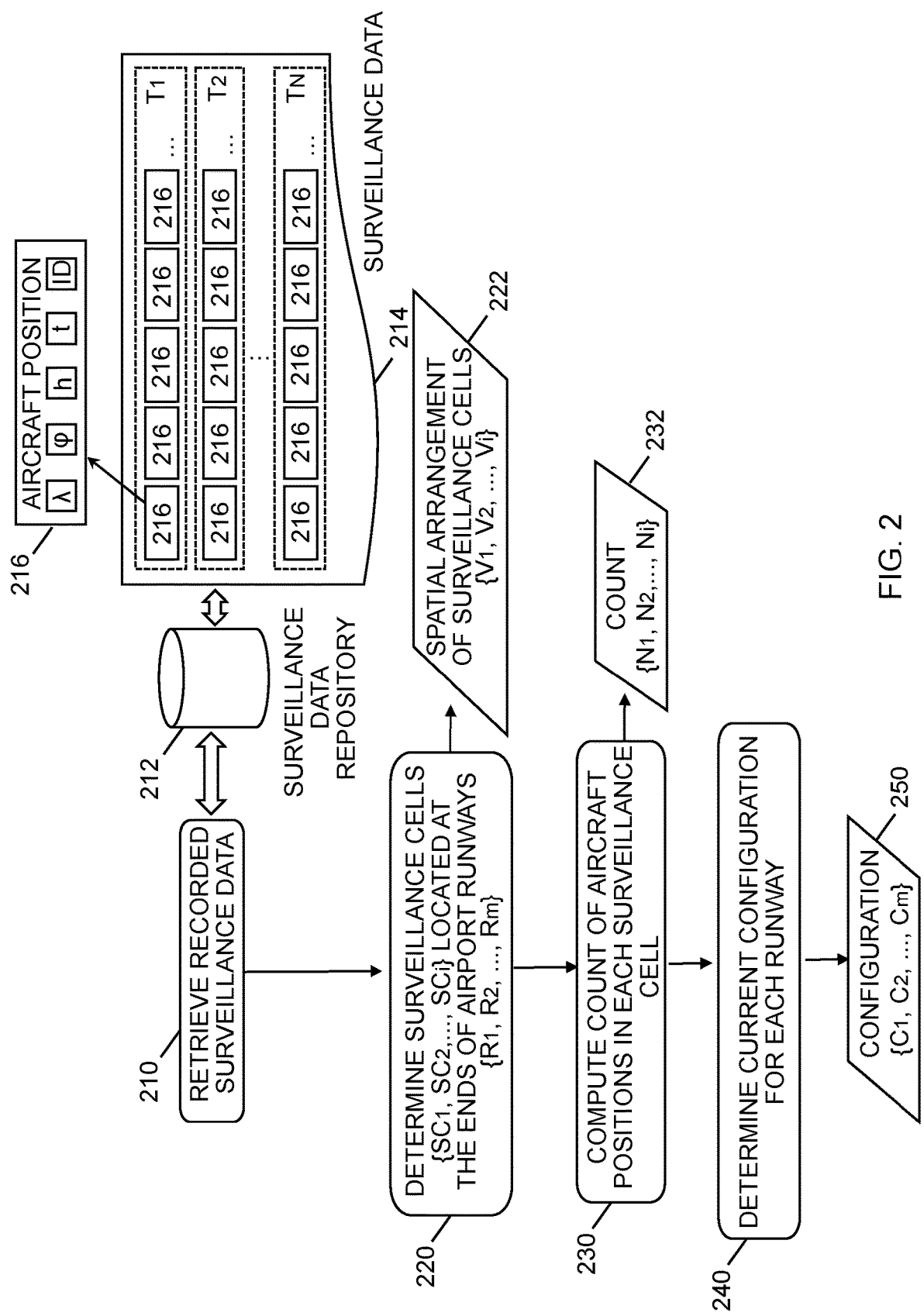
FIG. 2 depicts a flow chart of the method for determining the runway configuration of an airport.

Embodiments of the methods are depicted in the flow chart of FIG. 2. In particular, a method may include retrieving (e.g. obtaining) 210 recorded surveillance data 214 stored in a surveillance data repository 212.

The surveillance data 214 may comprise multiple instances of aircraft positions 216 at an airport, during take-off or landing maneuvers on one or more runways of the airport. The aircraft positions 216 may have been obtained by ADS-B, ASDI (Aircraft Situation Display to Industry), secondary radar, surface radar or any other data register source available at the airport. The aircraft positions 216 may include information to precisely locate an aircraft in space and time (for instance, altitude h, longitude $\lambda$ and latitude $\varphi$) and time record t), along with an aircraft identifier (ID) such as the tail number.

The instances of aircraft positions 216 may have been recorded during a given period of time or several periods of times $(T_1, T_2, \ldots, T_N)$. The aircraft positions 216 may have been registered for all the airport runways or for only a specific runway or group of runways (for instance, after applying a filtering process). Normally, the instances of aircraft positions 216 may correspond to different aircraft and include a plurality of positions over time registered for each aircraft involved. For instance, aircraft positions may be taken each few seconds during the landing or taking off.

Figure 3:
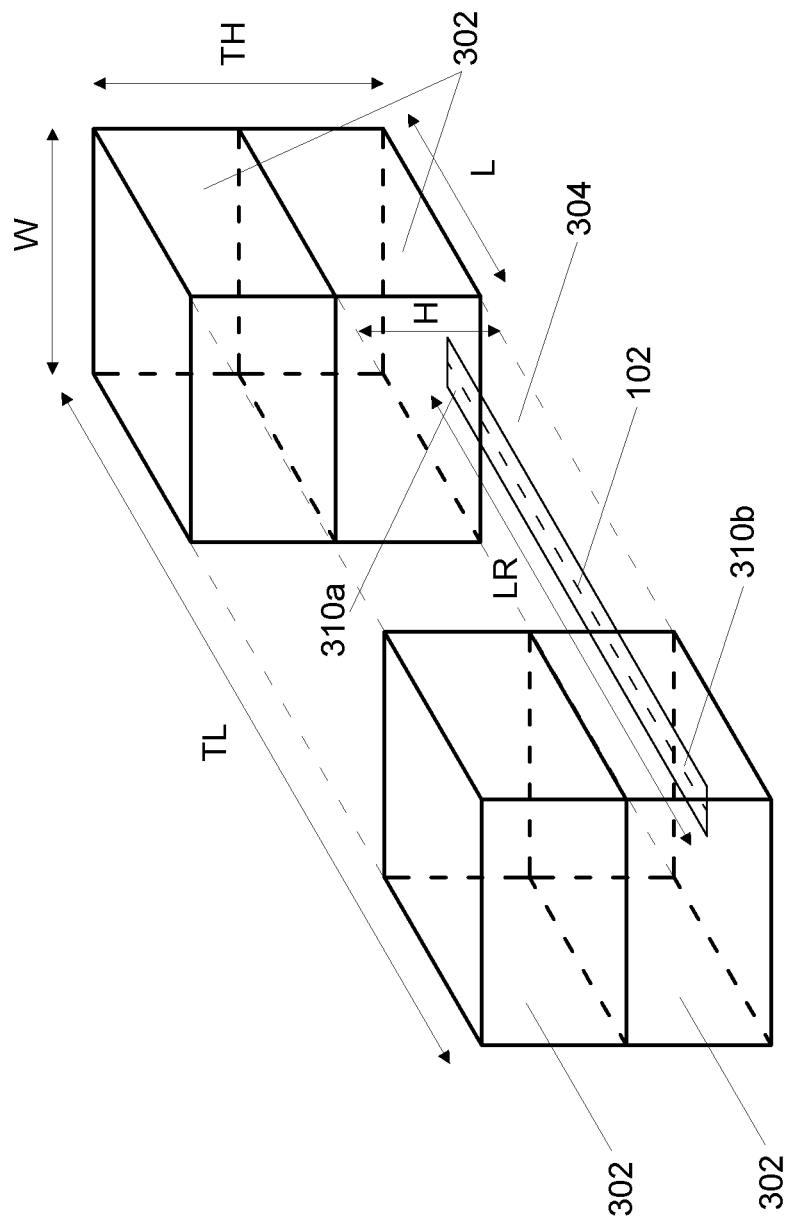
FIG. 3 illustrates an exemplary embodiment of the surveillance cells defined at each end of a runway.

The method may also include determining 220 three-dimensional surveillance cells at each end of one or more runways 102 $\{R_1, R_2, \ldots, R_m\}$ of the airport. In the exemplary embodiment depicted in FIG. 3, representing a perspective view of a runway 102, two surveillance cells 302 (e.g. 302a, 302b) are defined at each end of a runway 102. A simple mesh employs just these depicted four volumes, two at each extreme of the runway, one near the ground and the other on top of that. This basic mesh may capture the different slopes of aircraft landing and take-off, making it possible to differentiate the direction in use of the runway. In the embodiment of FIG. 3, the surveillance cells are parallelepipeds, the size of which may be proportional to the runway length (LR). For instance, the dimensions of the parallelepiped (length L, width W and/or height H) may be such that L=a·LR W=b·LR and/or H=c·LR. In order to define the three-dimensional surveillance cells 302 around each runway 102, the spatial disposition of the airport runways 102 must be previously known.

As depicted in FIG. 3, the surveillance cells 302 may also be obtained by defining one main parallelepiped 304 centered over the runway 102 and discarding its central part, such that two upper parts and two lower parts are defined at each end of the main parallelepiped 304, obtaining four surveillance cells 302 in the form of four smaller parallelepipeds. The size (length TL, height TH and width VV) of this main parallelepiped 304 may also be defined with relation to the runway length: TL=x·LR W=b·LR and/or TH=y·LR The parameters a, b, c, x and y can be numbers or percentages related to the runway length LR, and which can be optimized in an iterative process with a controlled training dataset.

In the embodiment of FIG. 3 the surveillance cells 302 are represented as rectangular parallelepipeds. However, other shapes for the volume defining the three-dimensional surveillance cells 302 may be selected, such as cylinders, cubes or hollow cylinder sectors. Besides, although the embodiment of FIG. 3 shows only two surveillance cells 302 at each side of the runway 102, there may be more than two surveillance cells 302 defined at each end of the runway 102. In an embodiment, there are at least two surveillance cells 302 at different heights defined at each end of the runway 102, so that aircraft taking off can be distinguished from aircraft landing on the runway 102.

The surveillance cells 302 may be defined at each end of the runway 102. The expression 'at each end of the runway' may be understood as the surveillance cells 302 partially or completely covering the extreme regions or ends of the runway 102, from a top view. For instance, in the embodiment of FIG. 4A, representing a top view of the example of FIG. 3, each surveillance cell 302 overlaps or contains, in the plan view, one of the two ends (310a, 310b) of the runway 102. FIG. 4B illustrates another embodiment of overlapping the end regions of the runway 102, using cylinders instead of parallelepipeds as surveillance cells 302. Alternatively, 'at each end of the runway' may also be understood as the surveillance cells 302 being located adjacent to the ends, as depicted in the example of FIG. 4C, or in an external region close (but not adjacent or overlapping) to the ends, as in the example of FIG. 4D.

Figure 6:
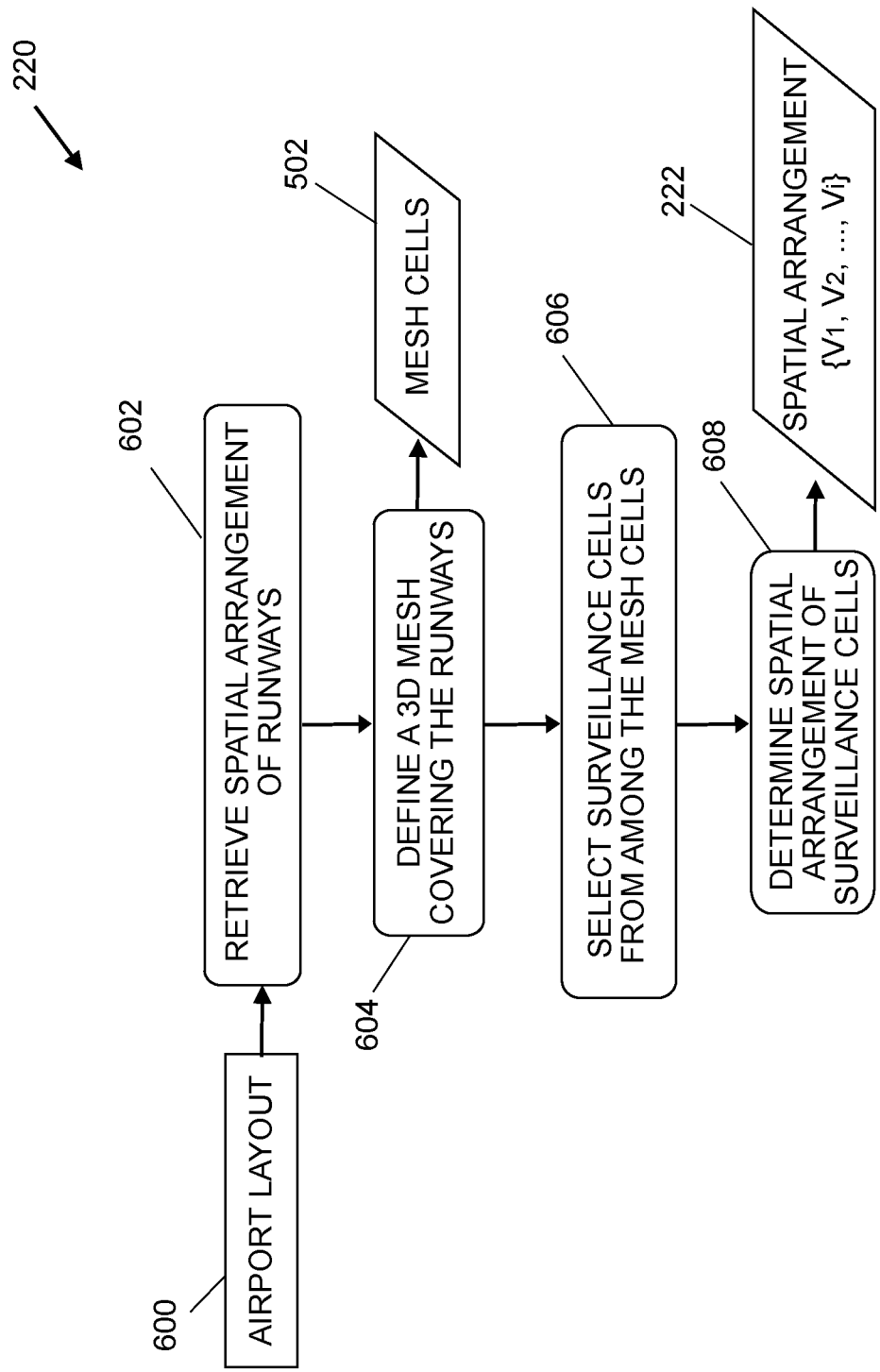
FIG. 6 represents an exemplary flow chart for the surveillance cells determination.

FIGS. 5A and 5B depict, respectively, a perspective view and a top view of an airport with three runways (102a, 102b, 102c) and the spatial arrangement thereof. The airport may have two parallel long runways (102a, 102b) and a crossing short runway (102c). In this embodiment, the step of determining surveillance cells 302 includes, as reflected in the flow chart of FIG. 6, retrieving 602 information on the spatial arrangement of the airport runways (e.g. length, orientation and starting point for each runway obtained from an airport layout 600 or any other equivalent information necessary to spatially locate the runways), and defining 604 a three-dimensional mesh 500 formed by a set of mesh cells 502 in the form of rectangular parallelepipeds, represented in broken lines in FIG. 5B. Although the use of rectangular parallelepipeds or cubes as basic mesh cells 502 may be advantageous for computational efficiency, the shape of the mesh cells 502 may also be different.

The mesh 500 may be defined over an area covering the airport, such that at least it contains (in a top view) all the relevant airport runways. In this illustrative embodiment the mesh 500 may be formed by a matrix of 9×9×3 mesh cells 502 (9 rows, 9 columns and a height of 3 cells), although in a real scenario it may comprise many more mesh cells 502 (tens, hundreds or even thousands of cells). The surveillance cells 302 may then be selected 606 from among the cells 502 of the mesh 500. In the example of FIG. 5A, sixteen mesh cells 502 have being identified as relevant (i.e. as surveillance cells 302) for the traffic counts in order to detect the configuration of the airport runways: two surveillance cells 302 at each end of the parallel long runways (102a, 102b) and four surveillance cells at each end of the crossing short runway (102c).

Once the surveillance cells have been selected 606, the spatial arrangement 222 of each surveillance cell may be determined 608. In particular, if i surveillance cells have been computed, each surveillance cell 302 is spatially defined so that the volume $\{V_1, V_2, \ldots, V_i\}$ delimiting each surveillance cell 302 may be determined.

In the example, as depicted in FIG. 5A, only the first two heights of the matrix 500 have been considered as relevant for the selection of the surveillance cells 302, but a different selection of cells may also be considered (e.g. considering the cells at the third height of the matrix). As previously explained, the surveillance cells 302 may:

Partially or completely cover (in a plan view) the ends of a runway.
Be adjacent to the ends of the runway.
Be close (and externally located) to the ends of the runway.

Back to the flow chart of FIG. 2, the method for determining the runway configuration may also include a step of computing 230, using the retrieved surveillance data 214, the number of aircraft positions 216 contained in each surveillance cell 302 for a given period of time ($T_x$) or several periods of times (e.g. $T_1$ and $T_2$).

Figure 7:
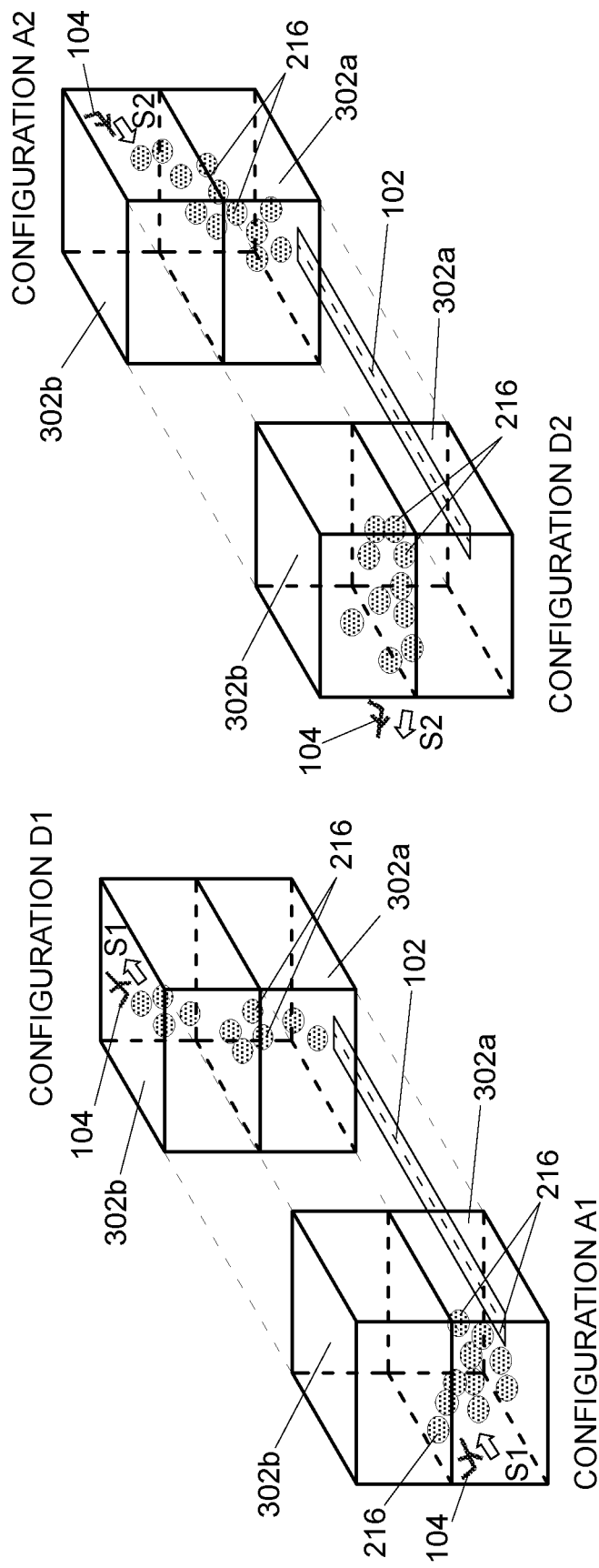
FIGS. 7A and 7B depicts aircraft positions for different runway configurations.

FIG. 7A illustrates aircraft positions 216 registered within different periods of time, when the runaway 102 is working using two different configurations (A1, D1) in a first direction s1. Instances of aircraft positions 216 normally correspond to samples taken from multiple different aircraft 104, and wherein some of the samples may refer to a same aircraft, reflecting the departure or arrival process at different instances of time. The samples shown in the lower-left margin of FIG. 7A correspond to aircraft positions 216 recorded when the runway 102 is running in configuration A1 (i.e. arrival, direction s1), where most of the samples are within the corresponding lower surveillance cell 302a. The samples in the upper-right area relate to aircraft positions 216 registered when the runway 102 is working in configuration D1 (i.e. departure, direction s1), most of the samples being contained in the corresponding upper surveillance cell 302b.

In the embodiment of FIG. 7B, instances of aircraft positions 216 are registered when the runaway 102 runs in two different configurations (A2, D2) in a second direction s2, opposite to the first direction s1. The aircraft positions 216 in the lower-left of FIG. 7B were recorded when the runway 102 was running in configuration D2 (departure, direction s2), with most of the samples being contained in the corresponding upper surveillance cell 302b. The aircraft positions 216 in the upper-right were registered when the runway 102 was running in configuration A2 (arrival, direction s2), where most of the aircraft positions 216 are contained in the corresponding lower surveillance cell 302a.

Figure 8:
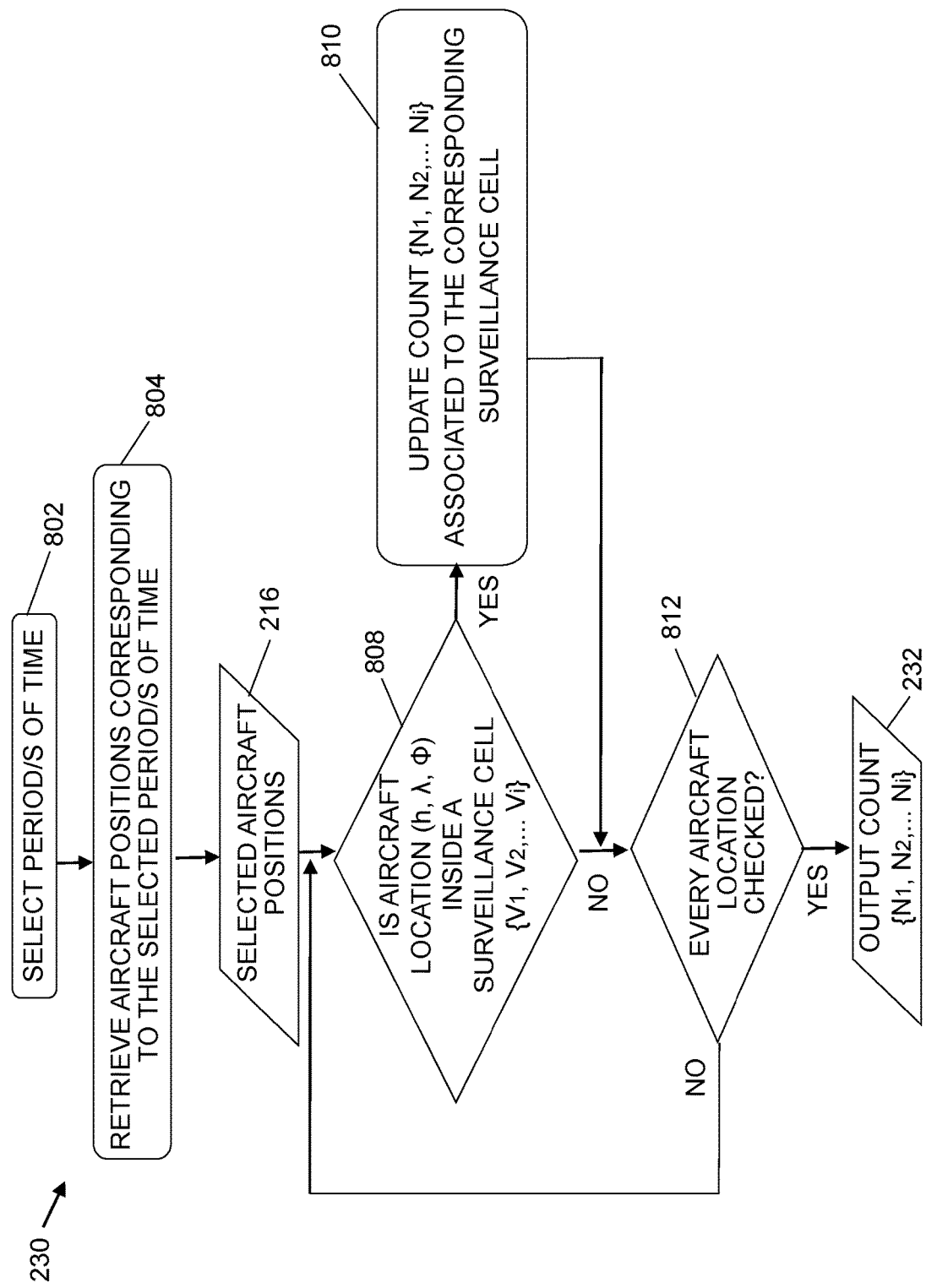
FIG. 8 shows a flow chart for the step of computing the number of aircraft positions in each surveillance cell.

In FIG. 8 a flow chart depicts an embodiment of the steps involved in the computing 230 of a count of the number of aircraft positions 216 within each surveillance cell 302. The aircraft positions 216 stored in the surveillance data repository 212 may be grouped in different periods of time ($T_1, T_2, \ldots, T_N$). The method may include selecting 802 one or more of these periods of time and retrieving 804 the aircraft positions corresponding to the given period or periods of time (using for instance the time record t of register aircraft positions 216), obtaining the selected aircraft positions 216. For each aircraft position 216, the registered aircraft location (h, λ, φ) may be compared 808 with the spatial arrangement 222 $\{V_1, V_2, \ldots, V_i\}$ of each surveillance cell 302 $\{SC_1, SC_2, \ldots, SC_i\}$. If the aircraft location (h, λ, φ) is within the volume $\{V_1, V_2, \ldots, V_i\}$ associated to a surveillance cell 302 (e.g. inside of the surveillance cell), a count associated to said surveillance cell 302 is updated 810 (increased by 1). Finally, once all the selected aircraft positions 216 have been checked 812, the count 232 $\{N_1, N_2, \ldots, N_i\}$ of aircraft positions computed for each surveillance cell is obtained.

The count 232 of the number of aircraft positions reported inside each surveillance cell may be fed to an algorithm used to determine 240 the current configuration 250 $\{C_1, C_2, \ldots, C_m\}$ of each runway involved $\{1, 2, \ldots, m\}$ based on the count computed for the surveillance cells 302 of the corresponding runway 102. The configuration may be selected among all the available configurations (A1 A2, D1, D2 or not in use, if the runway is not active).

To determine the current runway configuration a previous training may be performed based on multiple training surveillance data sets including instances of aircraft positions registered for all the configurations available to each runway. Each surveillance data set normally corresponds to a different period of time in which the runway configuration may have changed. The training may correspond to a supervised learning approach, where the runway configuration may be known for each instance of aircraft position, or to an un-supervised learning approach, where the runway configuration at the recorded time t of the instance may be unknown.

In the supervised learning approach, the training may be performed using a machine learning algorithm fed with known runway configurations added to the training surveillance data sets. The model features may be the number of registered aircraft positions inside the surveillance cells 302. For each period of time with counts on each surveillance cell, the known configuration (which may be added to the data set) is the dependent variable and the count for the surveillance cells is the independent variable. After many known configurations and periods of time, a machine-learning algorithm may be used to learn the pattern, so that just having the count 232 of the surveillance cells the algorithm outputs the runway configuration 250 $\{C_1, C_2, \ldots, C_m\}$ in use for all the runways $\{R_1, R_2, \ldots, R_m\}$ analyzed.

The size and shape of the surveillance cells 302 may also be optimized. To find the geometrical parameters that define the mesh and the surveillance cells ({a, b, c, x, y} in the example of FIG. 3), the model may be trained with a special controlled data set composed with data for a known period operating in each available runway configuration (A1 A2, D1, D2). Then, iterations with different geometrical parameters $\{a_i, b_i, c_i, x_i, y_i\}$ may be performed. The geometrical parameters which more clearly assign the right configuration to each data set in each period may be selected. Once the geometrical parameters have been optimized, a definitive training may be carried out with the selected geometrical parameters for the real training data set, including for instance several different days with changing configuration.

In the unsupervised learning approach, a number of periods may be clustered together to find at the end a number of clusters equal to the different airport configuration in use. For each runway, the model features may be the number of registered aircraft positions 216 inside the surveillance cells 302. In the embodiment of FIG. 3, there are four features (since there are four surveillance cells) for one runway. Since the training is unsupervised, the trainer may indicate the number of possible configurations expected for each runway (e.g. A1, A2, D1, D2, or not in use). The clustering algorithm may be fed with many instances of the four features at different intervals and may try to find the clusters. Therefore, unlike the supervised training, the configurations are not known but the algorithm may find them by clustering. The clustering algorithm may try to find clear clusters for five different scenarios: A1, D1 (FIG. 7A), A2, D2 (FIG. 7B), or not operating (zeros in the features). Then, for each cluster the centroids may be found and reference values of the four features may be used for classifying future situations. The centroids may represent the typical configurations. Once the algorithm is trained, just having the counts of the surveillance cells the algorithm outputs which cluster the configurations belongs to, and knowing the cluster the configuration in use can be known.

The method for determining the runway configuration of an airport may be used to update a flight plan of an aircraft based on the predicted runway configuration of the airport. FIGS. 9A, 9B, 10 and 11 show different scenarios in which an aircraft flight plan is updated.

Figure 9B:
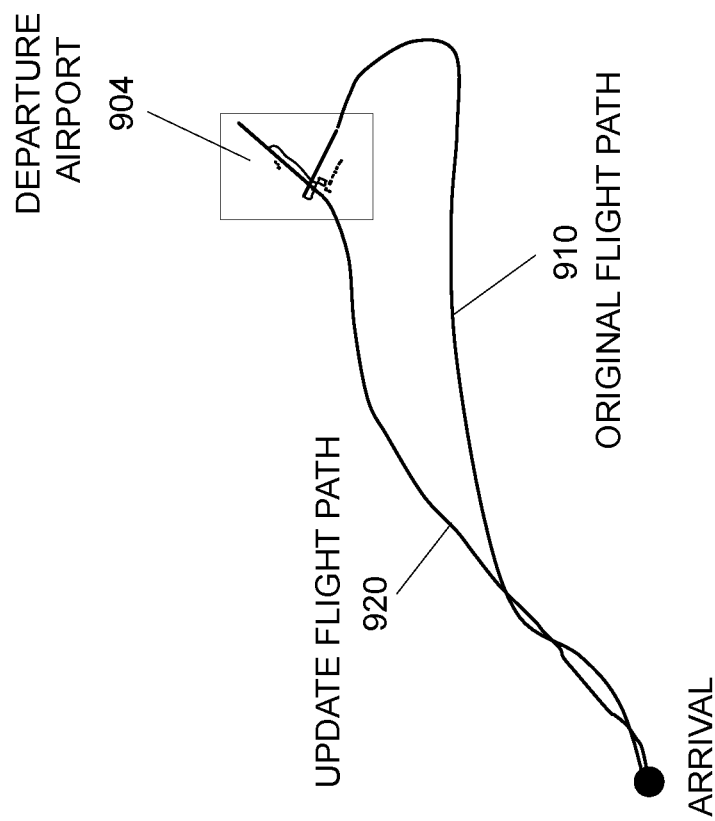
Figure 9A:
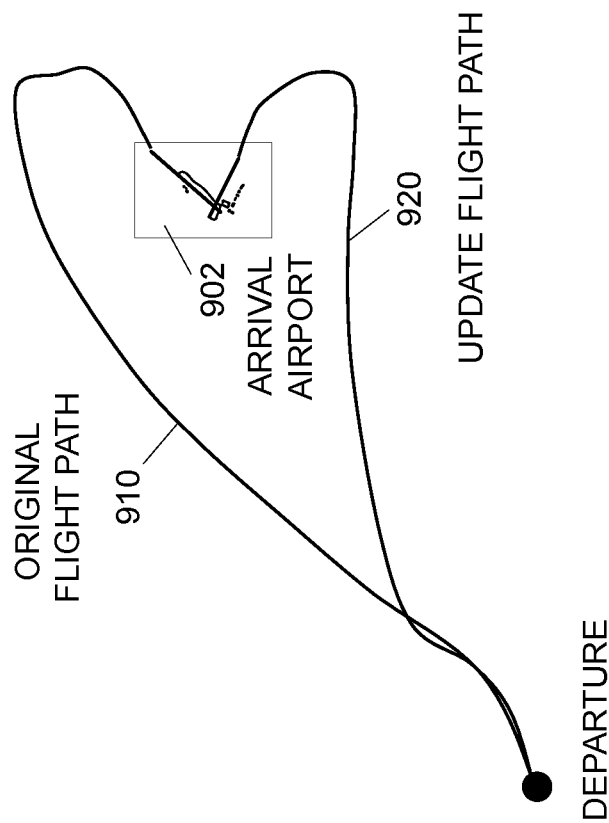

In the example of FIGS. 9A and 9B, the runway configuration may be applied during preflight phase to select an upgraded flight path and/or an updated quantity of fuel to load. The airport for which runway configuration may be predicted may be an arrival airport 902 (FIG. 9A) or a departure airport 904 (FIG. 9B) for the aircraft. Knowing the runway configuration of an arrival airport 902 or a departure airport 904 may imply a shorter updated flight path 920 than the original flight path 910, requiring less time and fuel to arrive at the destination.

The determination of the current runway configuration of an airport may also be applied during preflight to estimate the correct taxi time, as depicted in the example of FIG. 10. Knowing the runway configuration of an airport (either departure or arrival airport) may imply shorter/longer taxi-out/taxi-in time than the reference time, so that delays in departure can be avoided adjusting target off-block time and schedule of arrival adjusted considering the right taxi time. The taxiing plan (1002a or 1002b) of the aircraft may be updated based on the current runway configuration and the runway 102 selected.

Figure 11:
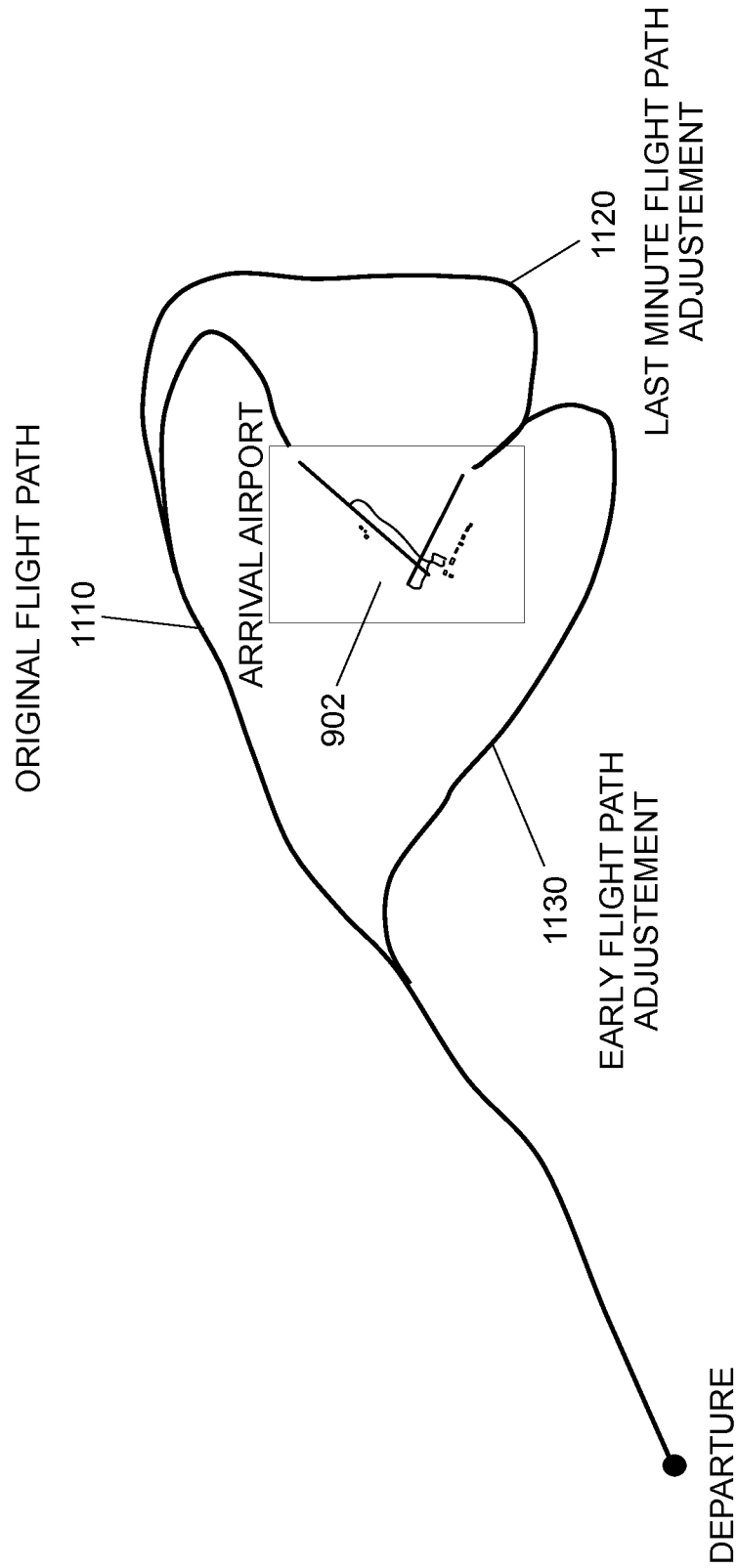

FIG. 11 represents another application of predicting the runway configuration, in this case performed in-flight to update the flight path in advance. In many cases, an aircraft follows an original flight path 1110 until the flight plan is updated when being close to the arrival airport 902 (last minute flight path adjustment 1120). However, knowing a change in the runway configuration of the arrival airport 902 in advance may be used to an early change of the original flight path 1110 to an updated flight path 1130 (early flight path adjustment) to avoid the less-efficient last-minute flight path adjustment 1120. This update may imply shorter flight paths than waiting for last minute adjustments.

Figure 12:
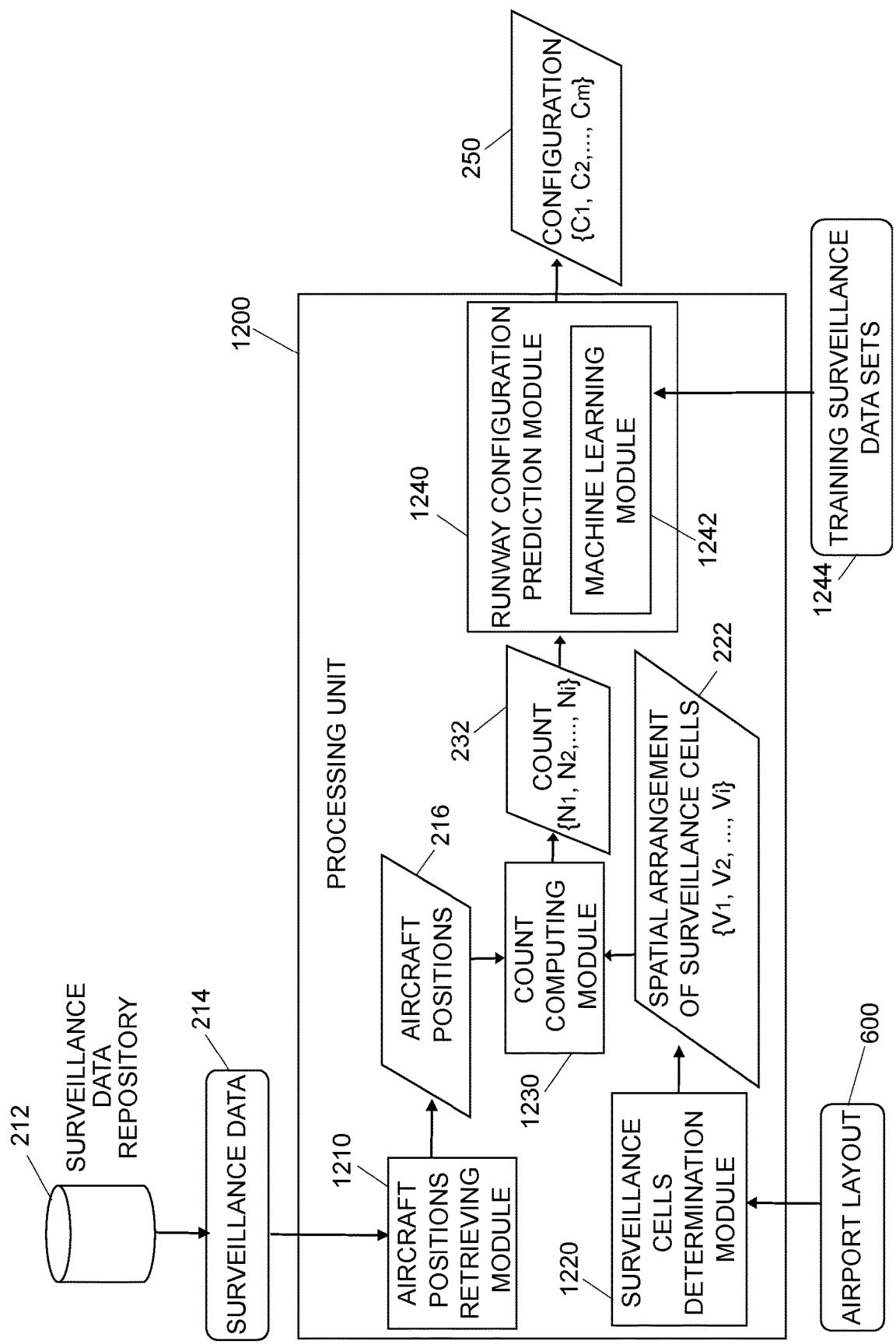
FIG. 12 depicts an exemplary embodiment of a system for determining the runway configuration of an airport.

FIG. 12 represents a system for determining the runway configuration of an airport. The system basically executes the steps of the method previously described. In an embodiment, the system is installed onboard an aircraft. The system may include a processing unit 1200, such as a processor, a microcontroller or a computer or any other similar electronic device equipped with data processing means. The processing unit 1200 may include:

An aircraft positions retrieving module 1210 configured to retrieve recorded surveillance data 214 including instances of aircraft positions 216 at an airport.

A surveillance cells determination module 1220 configured to determine a plurality of three-dimensional surveillance cells 302 $\{SC_1, SC_2, \ldots, SC_i\}$ at each end (310a, 310b) of at least one runway 102 of the airport. The module 1220 determines the spatial arrangement 222 of the volumes $\{V_1, V_2, \ldots, V_i\}$ associated to each surveillance cell 302.

A count computing module 1230 configured to compute a count 232 {N$_1$, N$_2$, . . . , N$_i$} of the number of aircraft positions 216 within each surveillance cell 302.

A runway configuration prediction module 1240 configured to predict a current configuration 250 for each runway 102 based on the count 232 computed for the surveillance cells 302 of the runway 102. In an embodiment, the prediction is performed based on a machine learning algorithm, such as artificial neural networks, clustering or support vector machines. To that end, the processing unit 1200 may comprise a machine learning module 1242 that applies machine learning in a previous training step using multiple training surveillance data sets 1244 including instances of aircraft positions for different configurations for each runway 102.

Figure 13:
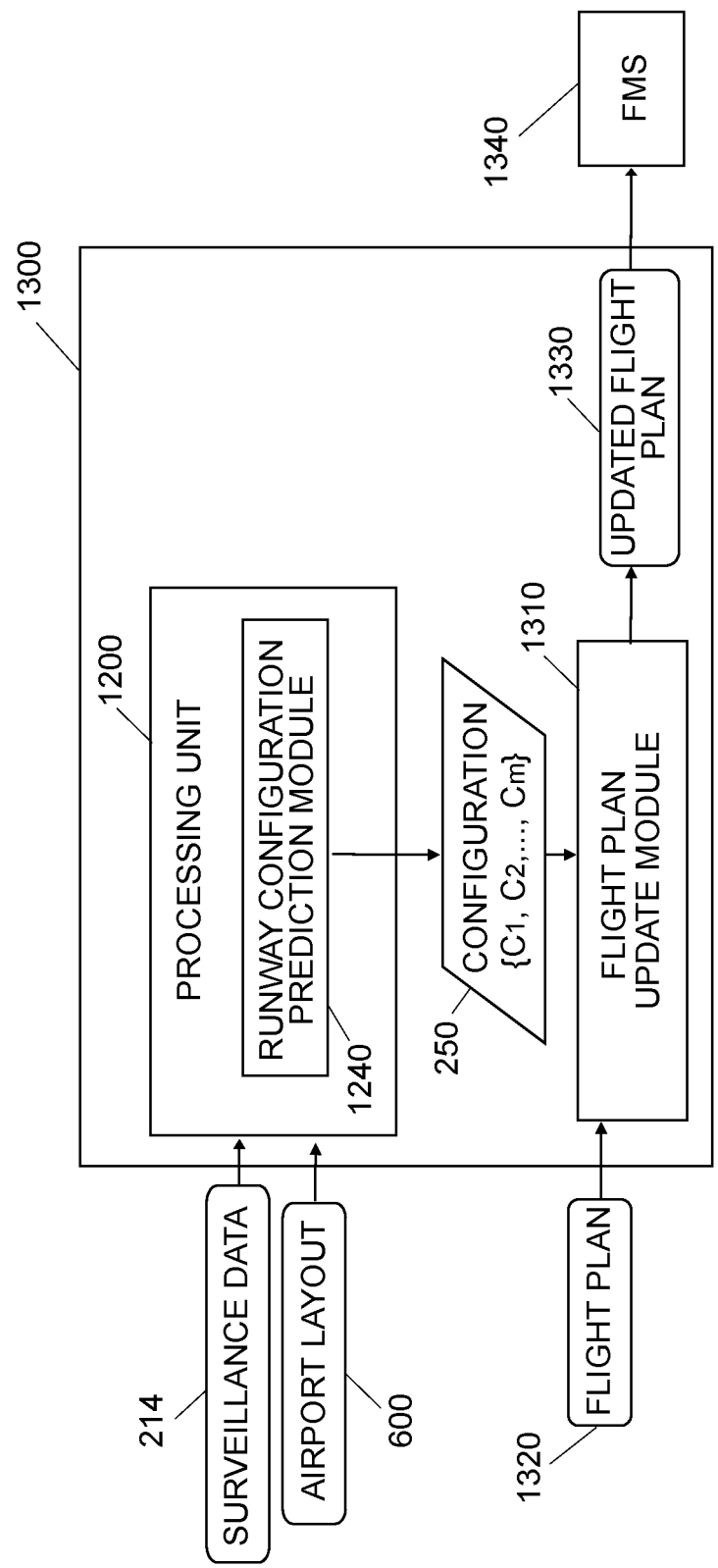
FIG. 13 shows an exemplary embodiment of a system for updating an aircraft flight plan.

FIG. 13 depicts a system 1300 for updating an aircraft flight plan. This system may be used, for instance, in the different scenarios described in FIGS. 9A, 9B, 10 and 11, when a flight path or taxiing plan needs adjustment (e.g. to be enhanced or updated for adjusting to changing conditions). The system is preferably installed onboard an aircraft for autonomous real-time computation and execution of an updated and optimized flight plan.

The system for updating a flight plan of an aircraft may use the airport runway configuration 250 predicted by the processing unit 1200 described in FIG. 12. The system 1300 for flight plan updating may include a flight plan update module 1310 (which may be part of the processing unit 1200 or a separate element, as depicted in FIG. 13) configured to receive a flight plan 1320 of an aircraft and compute an updated flight plan 1330 based on the predicted runway configuration 250 of the airport, which may be either an arrival airport 902 or a departure airport 904 for the aircraft. The updated flight plan 1330 may be transmitted to the Flight Management System (FMS) 1340 of the aircraft for execution (e.g. to carry out an updated flight path or an updated taxiing plan). In an embodiment, the processing unit 1200 and the flight plan update module 1310 may be part of the FMS 1340, so that both the computation and the execution of the updated flight plan is performed by the FMS 1340.

The invention claimed is:

1. A method for determining a runway configuration, comprising:
retrieving recorded surveillance data that comprises multiple aircraft positions and time records corresponding to the multiple aircraft positions at an airport;
computing a first number of the multiple aircraft positions contained in a first surveillance cell at a first end of a runway;
computing a second number of the multiple aircraft positions contained in a second surveillance cell at the first end of the runway, wherein the second surveillance cell is at a different height than the first surveillance cell;
determining a current configuration for the runway based at least partially on a comparison between the first number of the multiple aircraft positions contained in the first surveillance cell and the second number of the multiple aircraft positions contained in the second surveillance cell;
computing an updated flight plan based on the current configuration for the runway for execution by an aircraft; and
instructing the aircraft to fly or taxi according to the updated flight.

2. The method of claim 1, further comprising:
retrieving a spatial arrangement of the runway;
defining a three-dimensional mesh that encompasses the airport, the three-dimensional mesh being formed by a set of mesh cells; and
selecting the first surveillance cell and the second surveillance cell from among the set of mesh cells.

3. The method of claim 1, further comprising:
retrieving training surveillance data that comprises multiple other aircraft positions and other time records corresponding to the other aircraft positions, the training surveillance data grouped into periods of time; and
training a machine learning model using the training surveillance data, wherein the machine learning model predicts the current configuration for the runway based on the first number of the multiple aircraft positions within the first surveillance cell and based on the second number of the multiple aircraft positioned within the second surveillance cell.

4. The method of claim 3, wherein the training surveillance data includes known runway configurations corresponding to the periods of time.

5. The method of claim 4, further comprising, before training the machine learning model:
iteratively changing geometrical parameters associated with the plurality of the first surveillance cell and the second surveillance cell; and
determining a set of geometrical parameters that enable the machine learning model to predict the known runway configurations based on the other aircraft positions.

6. The method of claim 3, wherein training the machine learning model comprises:
computing additional numbers of the multiple other aircraft positions contained in the first surveillance cell and the second surveillance cell within the periods of time; and
receiving user input indicating a number of available configurations for the runway; and
for the runway, combining the periods of time based on the additional numbers of the multiple other aircraft positions to form clusters corresponding to the available configurations.

7. The method of claim 1, wherein the first surveillance cell and the second surveillance cell have a symmetry axis that runs parallel to the runway.

8. The method of claim 1, wherein the first surveillance cell and the second surveillance cell are parallelepipeds.

9. A method for updating an aircraft flight plan of an aircraft, comprising:
retrieving recorded surveillance data comprising multiple aircraft positions and time records corresponding to the multiple aircraft positions at an airport;
computing a first number of the multiple aircraft positions contained in a first surveillance cell at a first end of a runway;
computing a second number of the multiple aircraft positions contained in a second surveillance cell at the first end of the runway, wherein the second surveillance cell is at a different height than the first surveillance cell;

using a machine learning model to determine a current runway configuration for the runway based at least partially on a comparison between the first number of the multiple aircraft positions contained within the first surveillance cell and the second number of the multiple aircraft positions contained within the second surveillance cell;

updating the aircraft flight plan based on the current runway configuration for execution by an aircraft; and controlling flight of the aircraft or taxiing of the aircraft according to the updated fright plan.

10. The method of claim 9, wherein the airport is an arrival airport or a departure airport for the aircraft, wherein the updating of the aircraft flight plan is performed prior to departure of the aircraft, and wherein the method further comprises updating a quantity of fuel to be loaded onto the aircraft based on the current runway configuration of the airport.

11. The method of claim 9, wherein the airport is an arrival airport or a departure airport for the aircraft, and wherein updating the aircraft flight plan comprises updating a taxiing plan of the aircraft on the airport.

12. The method of claim 9, wherein the airport is an arrival airport of the aircraft, and the updating of the aircraft flight plan is performed during flight of the aircraft, and wherein updating the aircraft flight plan comprises determining a flight path for approaching the airport based on the current runway configuration of the airport.

13. A system for determining a runway configuration, comprising a processing unit configured to:
retrieve recorded surveillance data comprising aircraft positions at an airport;
determine a first three-dimensional surveillance cell and a second three-dimensional surveillance cell at an end of at least one runway of the airport;
compute a first number of the aircraft positions contained in the first three-dimensional surveillance cell;
compute a second number of the aircraft positions contained in the second three-dimensional surveillance cell;
determine a current configuration for the at least one runway by at least comparing the first number with the second number;
compute an updated flight plan based on the current configuration for the at least one runway for execution by an aircraft; and
facilitate operation of the aircraft according to the updated flight plan.

14. The system of claim 13, wherein the processing unit is further configured to:
retrieve a spatial arrangement of the at least one runway;
define a three-dimensional mesh that encompasses the airport, the three-dimensional mesh being formed by a set of mesh cells; and
select the first three-dimensional surveillance cell and the second three-dimensional surveillance cell from among the set of mesh cells.

15. The system of claim 13, wherein the processing unit is further configured to:
retrieve training surveillance data comprising other aircraft positions at the airport grouped into periods of time; and
train a machine learning model using the training surveillance data, wherein the machine learning model predicts the current configuration for the at least one runway based on the comparison of the first number with the second number.

16. The system of claim 15, wherein the training surveillance data includes known runway configurations corresponding to each of the periods of time.

17. The system of claim 16, wherein the processing unit is further configured to:
iteratively change geometrical parameters associated with the first three-dimensional surveillance cell and the second three-dimensional surveillance cell; and
determine a set of geometrical parameters that enable the machine learning model to predict the known runway configurations based on the other aircraft positions.

18. The system of claim 15, wherein the processing unit is further configured to:
compute additional numbers of the other aircraft positions contained in the first three-dimensional surveillance cell and the second three-dimensional surveillance cell within the periods of time;
receive user input indicating a number of available configurations for the at least one runway; and
combine the periods of time based on the additional numbers to form clusters corresponding to the available configurations.

19. The system of claim 13, wherein the first three-dimensional surveillance cell and the second three-dimensional surveillance cell have symmetry axes that run parallel to the at least one runway.

20. The system of claim 13, wherein the first three-dimensional surveillance cell and the second three-dimensional surveillance cell are parallelepipeds.

* * * * *